United States Patent
Ahn et al.

(10) Patent No.: US 10,802,537 B2
(45) Date of Patent: Oct. 13, 2020

(54) STRETCHABLE DISPLAY DEVICE INCLUDING OPTICAL MODULE AND METHOD OF USING THE STRETCHABLE DISPLAY DEVICE

(71) Applicant: Samsung Display Co. Ltd., Yongin-si, Gyeonggi-do (KR)

(72) Inventors: Yi Joon Ahn, Seoul (KR); Sung Chul Kim, Seongnam-si (KR); Jung Hun Noh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 88 days.

(21) Appl. No.: 15/959,392

(22) Filed: Apr. 23, 2018

(65) Prior Publication Data

US 2019/0064875 A1 Feb. 28, 2019

(30) Foreign Application Priority Data

Aug. 25, 2017 (KR) .......................... 10-2017-0107973

(51) Int. Cl.
*G06F 1/16* (2006.01)
*H04N 5/225* (2006.01)

(52) U.S. Cl.
CPC .......... *G06F 1/1601* (2013.01); *G06F 1/1626* (2013.01); *G06F 1/1637* (2013.01); *G06F 1/1652* (2013.01); *G06F 1/1686* (2013.01); *H04N 5/2253* (2013.01); *H04N 5/2254* (2013.01); *H04N 5/2257* (2013.01)

(58) Field of Classification Search
CPC .... G06F 1/1601; G06F 1/1652; G06F 1/1686; G06F 1/1626; G06F 1/1637; H04N 5/2254; H04N 5/2257; H04N 5/2253; G09F 9/301
See application file for complete search history.

(56) References Cited

U.S. PATENT DOCUMENTS

| | | | |
|---|---|---|---|
| 2013/0265262 A1* | 10/2013 | Jung ...................... | G06F 3/0416 345/173 |
| 2014/0015402 A1* | 1/2014 | Ahn ....................... | H05B 33/02 313/511 |
| 2016/0301832 A1* | 10/2016 | Xu ......................... | H04N 5/2258 |
| 2016/0373654 A1* | 12/2016 | Kwon .................... | G09G 5/373 |

FOREIGN PATENT DOCUMENTS

| | | |
|---|---|---|
| KR | 1020160150539 A | 12/2016 |
| TW | 201403807 A | 1/2014 |

\* cited by examiner

*Primary Examiner* — Carolyn R Edwards
(74) *Attorney, Agent, or Firm* — Cantor Colburn LLP

(57) ABSTRACT

A display device includes: a stretchable display panel which displays an image at a display surface thereof; and an optical module which is disposed on a surface of the stretchable display panel opposite to the display surface thereof. The optical module is visible or non-visible from outside the stretchable display panel by expansion or contraction of the stretchable display panel.

20 Claims, 17 Drawing Sheets

STRETCHABLE DISPLAY DEVICE INCLUDING OPTICAL MODULE AND METHOD OF USING THE STRETCHABLE DISPLAY DEVICE

This application claims priority to Korean Patent Application No. 10-2017-0107973, filed on Aug. 25, 2017, and all the benefits accruing therefrom under 35 U.S.C. § 119, the disclosure of which is incorporated herein by reference in its entirety.

BACKGROUND

1. Field

The present disclosure relates to a stretchable display device including an optical module and a method of using the stretchable display device.

2. Description of the Related Art

As display device-related techniques have been developed and improved, display devices capable of being deformed (for example, folded in half, rolled or stretched in at least one direction) at the stage of use thereof have been researched and developed. A stretchable display device among other deformable display devices is a type of next-generation display device that is expandable or contractible in at least one direction.

SUMMARY

Exemplary embodiments of the present disclosure provide a stretchable display device capable of providing an image display screen at substantially an entire area of a front surface thereof.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, a display device includes: a stretchable display panel which displays an image at a display surface thereof; and an optical module which is disposed on a surface of the stretchable display panel opposite to the display surface thereof. The optical module is visible or non-visible from outside the stretchable display panel by expansion or contraction of the stretchable display panel the stretchable display panel.

According to another exemplary embodiment of the present disclosure, a display device includes: an optical module which performs a function using light; and a stretchable display panel which displays an image at a display surface thereof, the stretchable display panel disposed on the optical module to cover the optical module. The optical module is exposed outside the stretchable display panel by expansion or contraction of the stretchable display panel.

According to another exemplary embodiment of the present disclosure, a method of using an optical module of a display device, the method including: preparing a stretchable display panel which displays an image at a display surface thereof; disposing an optical module which performs a function with light, on a surface of the stretchable display panel opposite to the display surface thereof; and expanding or contracting the stretchable display panel to expose the optical module outside the stretchable display panel and using the exposed optical module to perform the function using the light.

According to the aforementioned and other exemplary embodiments of the present disclosure, substantially an entirety of a front surface of a stretchable display device at a viewing side thereof is provided as a display screen for outputting an image.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
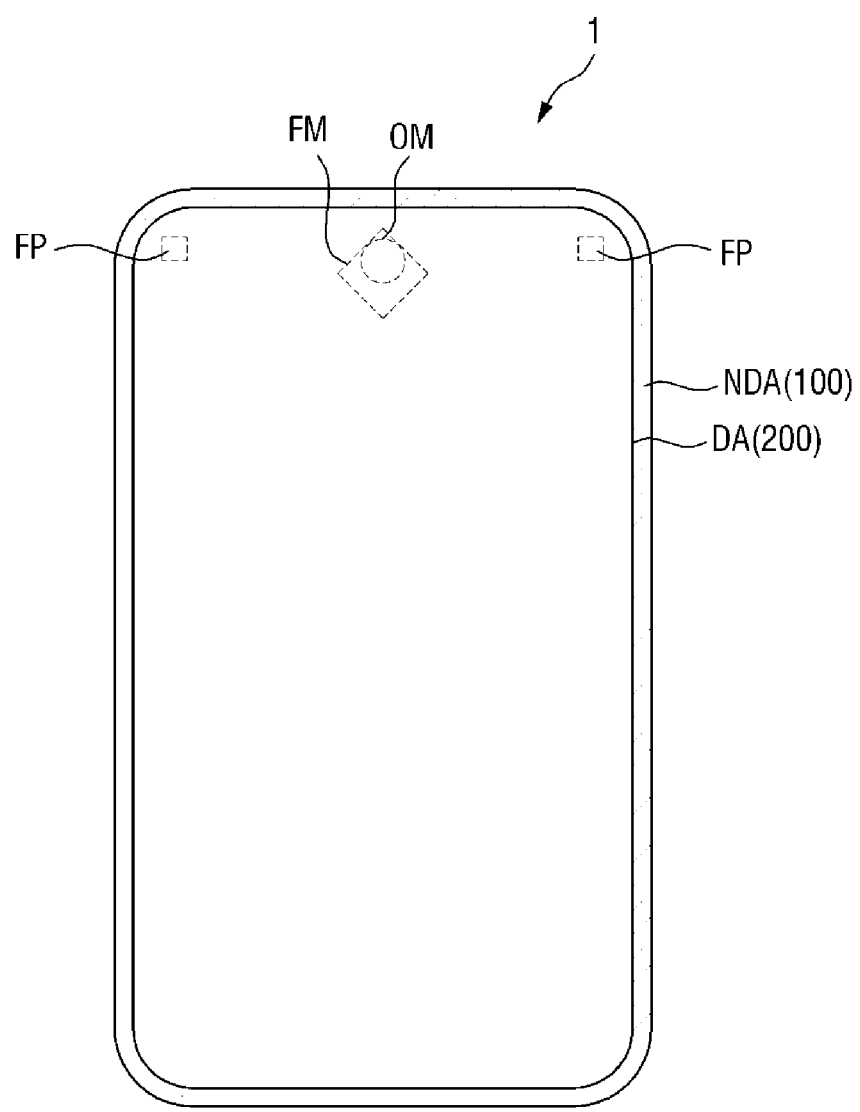
FIG. 1 is a top plan view of an exemplary embodiment of a stretchable display device according to the invention.

Features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the invention to those skilled in the art, and the invention will only be defined by the appended claims. Like reference numerals refer to like elements throughout.

It will be understood that when an element or layer is referred to as being related to another elements such as being "on," "connected to" or "coupled to" another element or layer, the element or layer can be directly on, connected or coupled to another element or layer or intervening elements or layers. In contrast, when an element is referred to as being related to another element such as being "directly on," "directly connected to" or "directly coupled to" another element or layer, there are no intervening elements or layers present. As used herein, connected may refer to elements being physically, electrically and/or fluidly connected to each other.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A display device may include an optical module such as a camera module, an illumination sensor, a fingerprint sensor or the like that performs an optical function. A space may be provided at the front of the display device in order for the optical module to perform a light output/input function.

However, since a screen for outputting an image is disposed a distance away from the space provided for the optical module, there is a limit in increasing the ratio of the area of the screen to the entire area of the display device, as viewed from the front, e.g., the screen-to-body ratio of the display device.

A stretchable display device may be a display device that is expandable or contractible (hereinafter, collectively referred to as "stretchable") in at least one direction. In a stretchable display panel included in the stretchable display device, light-emitting elements, which are basic units for displaying an image in a display device, are connected to one another via flexible wirings and are thus movable independently of one another. Accordingly, the stretchable display panel including such independently movable elements becomes stretchable. However, the structure for imparting stretchability to a display panel is not particularly limited, and the stretchable display panel can be realized by various configurations other than those set forth herein.

The stretchable display device may also be a display device capable of returning to an original shape thereof, after being stretched in one side direction by an external force, in response to the external force disappearing (e.g., disposing the display device in an equilibrium state thereof), but the present disclosure is not limited thereto. That is, the stretchable display device may be a display device that is deformed by an external force and then maintains a deformed shape even in the absence of the external force or an additional external force.

Exemplary embodiments of the present disclosure will hereinafter be described with reference to the accompanying drawings.

FIG. 1 is a top plan view of an exemplary embodiment of a stretchable display device according to the invention.

Referring to FIG. 1, a stretchable display device 1 includes a display area DA in which an image is displayed to be viewed at a viewing (front) side of the display device, and a non-display area NDA which adjoins the display area DA and in which no image is displayed. In some exemplary embodiments, the non-display area NDA may be disposed to surround the display area DA, in the top plan view. The display area DA may correspond to a (display) screen of the stretchable display device 1.

The stretchable display device 1 and various components thereof are disposed in a plane, such as a plane defined by first (horizontal in FIG. 1) and second (vertical in FIG. 1) directions. A thickness of the stretchable display device 1 and various components thereof is taken in a third direction (into the view of FIG. 1).

In an exemplary embodiment, for example, the display area DA may be an area at which the display surface of a stretchable display panel 200 included in the stretchable display device 1 is viewable. The non-display area NDA may be an area at which a frame member 100 generally disposed at sides and the rear of the stretchable display device 1 is viewable and at which portions of the stretchable display panel 200 are excluded. However, the present disclosure is not limited to this example. That is, in another example, the display area DA and the non-display area NDA may both exist at the display surface of the stretchable display panel 200. In the description that follows, the display area DA and the display surface of the stretchable display panel 200 will hereinafter be described as substantially overlapping with each other, but the present disclosure is not limited thereto.

FIG. 1 illustrates that part of the frame member 100 is viewable from the front of the stretchable display device 1. That is, portions of the frame member 100 and the stretchable display panel 200 may form an entire of the front surface of the stretchable display device 1. However, alternatively, the stretchable display panel 200 may be disposed to define the entire front surface of the stretchable display device 1, and as a result, only the stretchable display panel 200, but not the frame member 100, may be visible from the front of the stretchable display device 1.

The stretchable display device 1 may further include an optical module OM, a fixing member FM, and a fixing member FP provided in plurality, which are each disposed on the rear surface of the stretchable display panel 200. The rear surface of the stretchable display panel 200 may refer to the surface of the stretchable display panel 200 that is opposite to the display surface (or front surface) of the stretchable display panel 200 along a thickness direction of the stretchable display device 1.

The optical module OM may refer to any of a number of modules which performs a function using light and may be, for example, a camera module, but the present disclosure is not limited thereto. That is, alternatively, the optical module OM may be an illumination sensor and/or a fingerprint sensor.

The optical module OM may be initially hidden from view by the stretchable display panel 200 and may become visible in response to the stretchable display panel 200 being stretched. In a case where the stretchable display panel 200 has a restoring force by which a stretched display panel 200 is returnable to an original shape thereof without an external force, the fixing member FM may allow the stretchable display panel 200 to maintain a stretched state thereof. In an exemplary embodiment, the fixing members FP may fix edges of the stretchable display panel 200 in the stretched states thereof to other parts of the stretchable display panel 1, such as the frame member 100, and may thus allow the stretchable display panel 200 to remain stretched only in selected areas.

The elements of the stretchable display device 1 will hereinafter be described in further detail with reference to enlarged top plan views and cross-sectional views of the stretchable display device 1.

Figure 2:
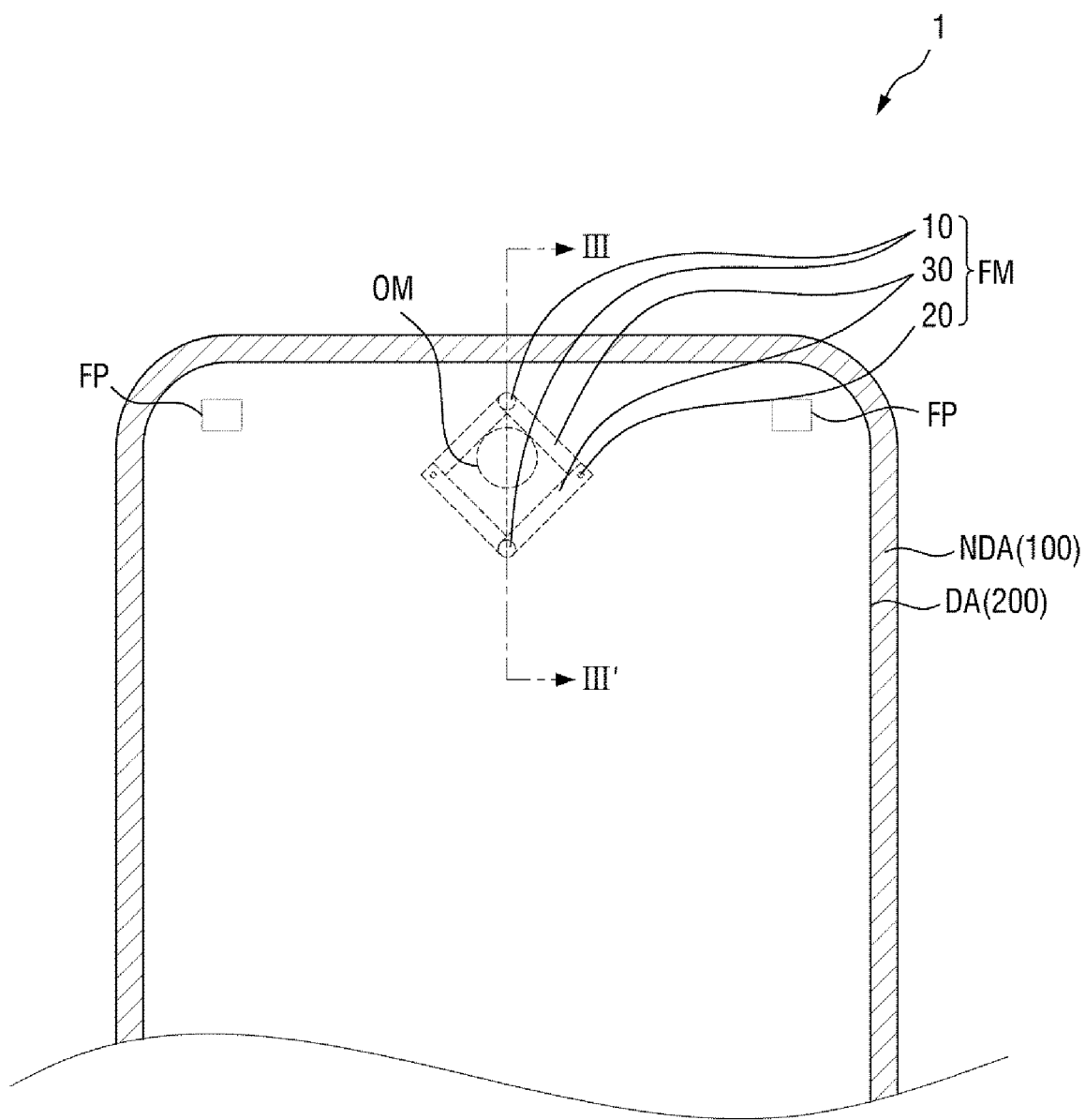
FIG. 2 is an enlarged top plan view of an area including an optical module of FIG. 1.
Figure 3:
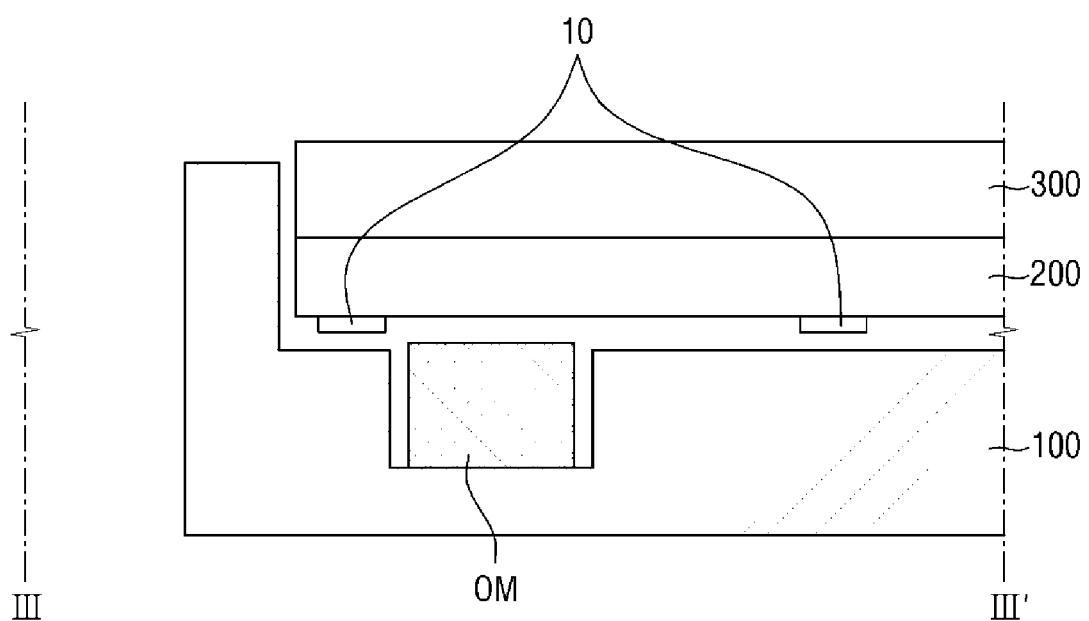
FIG. 3 is a cross-sectional view taken along line of FIG. 2.

FIG. 2 is an enlarged top plan view of an area including the optical module OM of FIG. 1, and FIG. 3 is a cross-sectional view taken along line of FIG. 2.

Referring to FIGS. 2 and 3, the stretchable display device 1 includes the frame member 100, the stretchable display panel 200 which is disposed on the frame member 100, and the optical module OM which is disposed between the frame member 100 and the stretchable display panel 200. The stretchable display device 1 may further include the fixing member FM, which is disposed on the rear surface of the stretchable display panel 200, and a window 300 which is disposed on the stretchable display panel 200. The window 300 may form an outer surface of the stretchable display device 1 at the viewing side thereof. Where the window 300 is omitted, a display surface of the stretchable display panel 200 may form an outer surface of the stretchable display device 1 at the viewing side thereof.

As used herein, the terms "upper," "top" and "top surface" refer to a display surface side of the stretchable display device 1, and the terms "lower," "bottom" and "bottom surface" refer to a side opposite to the display surface of the stretchable display device 1.

The frame member 100 may receive and protect internal elements of the stretchable display device 1, which are disposed at an upper portion of the stretchable display device 1, such as being disposed into the frame member 100 from outside the display device. The frame member 100 may be a bottom chassis, a rear case or a bracket of the stretchable display device 1. The frame member 100 may be in the shape of a rectangular plate having a storage space defined therein.

In an exemplary embodiment, for example, the outer sides of the frame member 100 may be exposed and may thus form the exterior of the stretchable display device 1, but the present disclosure is not limited thereto. A housing (not illustrated) may be coupled to the exterior of the frame member 100 to form the exterior of the stretchable display device 1.

The stretchable display panel 200 may include display elements which generate and output an image via the display surface (or the top surface) of the stretchable display panel 200. As mentioned above, light-emitting elements included in the stretchable display panel 200 may be disposed to be movable independently of one another, and as a result, the stretchable display panel 200 may become stretchable. However, the structure for imparting stretchability to the stretchable display panel 200 is not particularly limited.

The optical module OM may be disposed between the stretchable display panel 200 and the frame member 100. The optical module OM may be disposed on the bottom surface of the stretchable display panel 200 to overlap with the stretchable display panel 200. That is, the optical module OM may be covered by the stretchable display panel 200 and may thus be invisible from outside the stretchable display device 1, e.g., a direction opposite to the display surface of the stretchable display panel 200.

The fixing member FM may be disposed on the bottom surface of the stretchable display panel 200. The fixing member FM may be deformed or moved relative to an original position thereof only when a force stronger than the restoring force of the stretchable display panel 200 is applied. Accordingly, in response to an external force stronger than the restoring force of the stretchable display panel 200 being applied, the fixing member FM and/or a position thereof may also be deformed along with the stretchable display panel 200. Then, when the external force disappears, only the restoring force of the stretchable display panel 200 is applied, and thus, an internal force (e.g., static friction force) of the fixing member FM may reduce or effectively prevent the stretchable display panel 200 from returning to an original shape or dimension thereof.

The fixing member FM may include a fixed shaft 10 which is fixed to the stretchable display panel 200, a movable shaft 20 which is not fixed to the stretchable display panel 200, and a link member 30 which connects a plurality of the fixed shafts 10 and plurality of the movable shafts 20 to each other. The link members 30 may be rotatable about the fixed shafts 10 and/or the movable shafts 20. A plurality of fixed shafts 10, a plurality of movable shafts 20, and a plurality of link members 30 may be provided.

The fixed shafts 10 may be connected to each other indirectly via the link members 30 and the movable shafts 20, and as the link members 30 are movable about the fixed shafts 10 and/or the movable shafts 20, the positions of the fixed shafts 10 may change accordingly. Since the fixed shafts 10 are fixed to the stretchable display panel 200, the movement of the fixed shafts 10 and the stretching of the stretchable display panel 200 may be dependent upon each other.

The static friction force from the rotation of the link members 30 about the fixed shafts 10 and/or the movable shafts 20 may be stronger than the restoring force of the stretchable display panel 200. As already mentioned above, the positions of the fixed shafts 10 may be changed by the rotation of the link members 30 only when a force stronger than the restoring force of the stretchable display panel 200 is applied to the fixing member FM. Accordingly, the stretchable display panel 200 to which the fixing member FM is fixed can be stretched.

The fixing member FM has been described above as being a passive member that is either fixed at a position or deformed depending on the magnitude of an external force applied thereto, but the present disclosure is not limited thereto. That is, alternatively, the fixing member FM may be an active member capable of controlling the stretch of the stretchable display panel 200 by controlling the positions of the fixed shafts 10 through the dynamic rotation of the movable shafts 20 such as with external power applied to the fixing member FM.

FIGS. 2 and 3 illustrate that a single fixing member FM collectively having two fixed shafts 10 is provided at a certain part of the stretchable display device 1, but the present disclosure is not limited thereto. That is, the number and the locations of fixed shafts 10 and/or fixing members FM may vary. If the stretchable display panel 200 does not have a restoring force, the fixing member FM may be omitted.

The fixing parts FP may fix parts of the stretchable display panel 200 to the frame member 100. The fixing parts FP may be disposed at edges of the stretchable display panel 200 in the top plan view. Accordingly, when the stretchable display panel 200 is stretched in one direction, the edges of the stretchable display panel 200 may be fixed in a position so as not to be moved during stretching of the stretchable display panel 200.

The fixing parts FP may be parts connecting the stretchable display panel 200 and the frame member 100 to each other as one integral body or may be parts connecting the stretchable display panel 200 and the frame member 100 indirectly via additional coupling members. The fixing parts FP may also be parts connecting the stretchable display panel 200 not only to the frame member 100, but also to other elements of the stretchable display device 1. In an exemplary embodiment, the fixing parts FP may be omitted.

Although not specifically illustrated, the fixing member FM may further include a straight or linear bar member having a connecting portion which crosses a middle of the area defined by the fixing member FM, such as arranged horizontally in FIG. 2, but not being limited thereto.

The window 300 is disposed on the stretchable display panel 200. The window 300 protects the stretchable display panel 200 from external shock and transmits light emitted from the stretchable display panel 200 therethrough. The window 300 may overlap with the stretchable display panel 200 and may be disposed to cover the front surface of the stretchable display panel 200. The window 300, like the stretchable display panel 200, may include or be formed of a stretchable material and may thus be stretchable. That is, portions of the frame member 100 and the window 300 may form an entire of the front surface of the stretchable display device 1, without being limited thereto. In an exemplary embodiment, the elongation rate of the window 300 may be the same as the elongation rate of the stretchable display panel 200.

Figure 4:
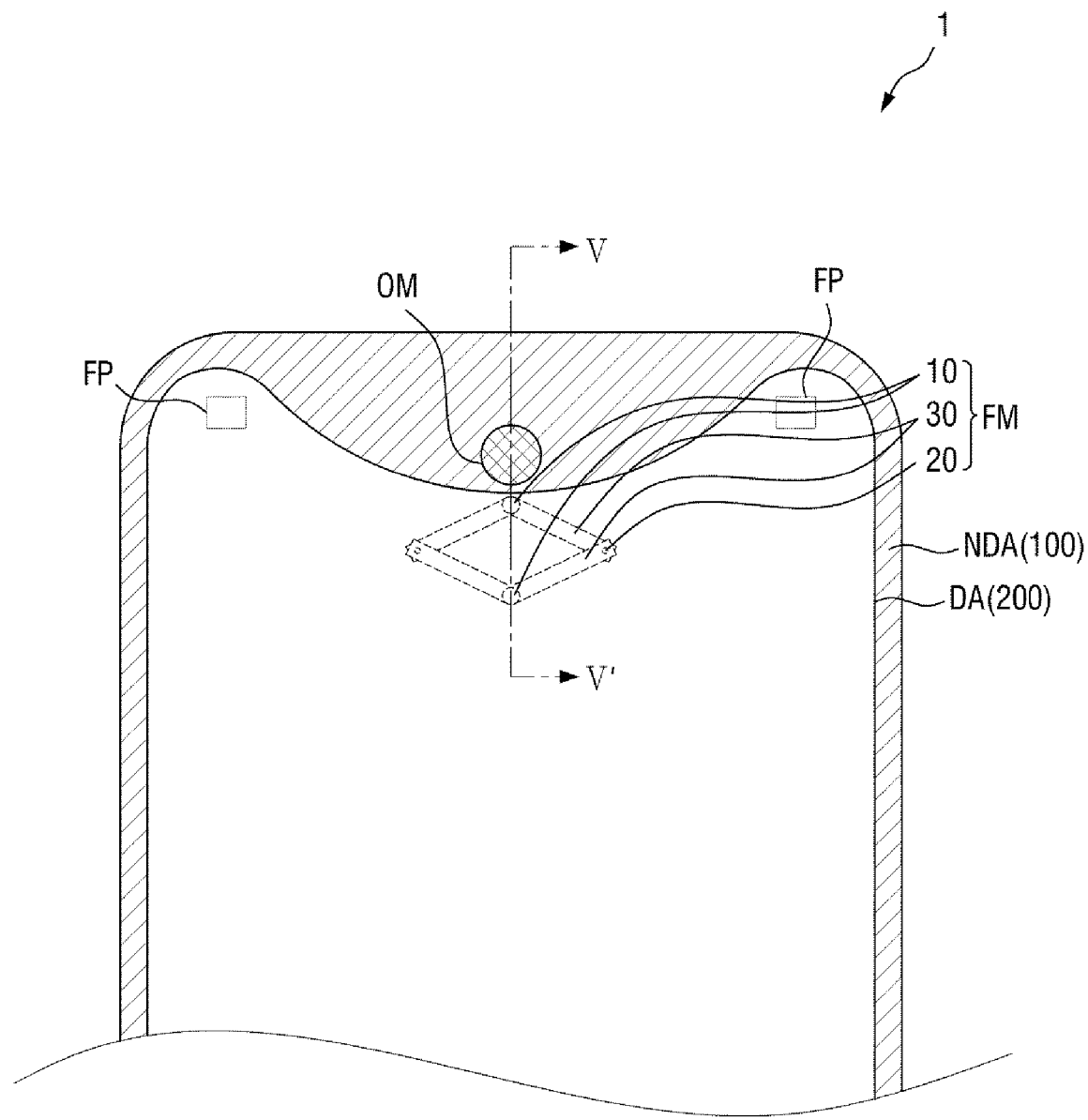
FIG. 4 is a top plan view illustrating the stretchable display panel of FIG. 2 in a state of being stretched in one direction.
Figure 5:
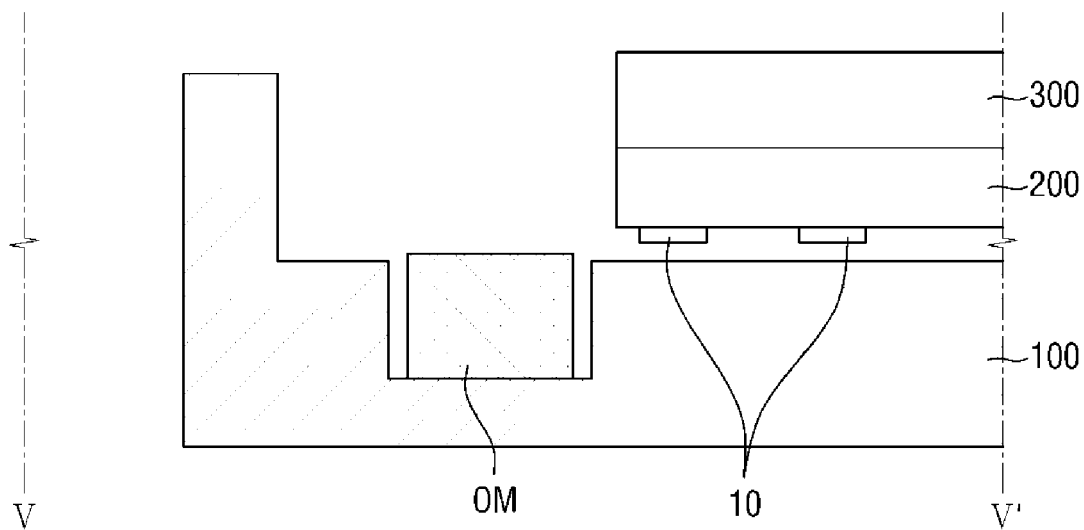
FIG. 5 is a cross-sectional view taken along line V-V' of FIG. 4.

FIG. 4 is a top plan view illustrating the stretchable display panel of FIG. 2 in a state of being stretched in one direction, and FIG. 5 is a cross-sectional view taken along line V-V' of FIG. 4.

Referring to FIGS. 4 and 5, the stretchable display panel 200 may be contracted in one direction, for example, a downward or vertical direction (in FIG. 4) or a rightward direction (in FIG. 5), by an external force applied to the stretchable display panel 200 in such direction. An original distance between the fixed shafts 10 in the one direction (FIGS. 2 and 3) is reduced (FIGS. 4 and 5), while an original distance between movable shafts 20 in a direction perpendicular to the one direction is increased. The stretchable display panel 200 is displaced within the plane of the stretchable display panel 200, that is, in the first and/or second directions which define the plane of the stretchable display panel 200, to be contracted or expanded.

As being contracted, a planar area occupied by the stretchable display panel 200 within the stretchable display device 1 may be reduced, such as at a portion of the stretchable display panel 200 corresponding to the optical module OM. Conversely, as being expanded, a planar area occupied by the stretchable display panel 200 within the stretchable display device 1 may be increased, such as at a portion of the stretchable display panel 200 corresponding to the optical module OM. As illustrated in FIGS. 4 and 5, a planar area of the stretchable display panel 200 at an area of the optical module OM is smaller than that of the stretchable display panel 200 in FIGS. 2 and 3.

A source of the external force to the stretchable display panel 200 is not particularly limited. In an exemplary embodiment, a user of the stretchable display device 1 may apply a mechanical or physical force to the stretchable display panel 200. In another exemplary embodiment, the external force may also be generated mechanically or electrically within the stretchable display device 1 by components thereof.

As a result of the external force applied to the stretchable display panel 200, the optical module OM hidden from view by the stretchable display panel 200 may be exposed from the stretchable display panel 200 at a front surface of the stretchable display device 1. With the optical module OM exposed from the stretchable display panel 200, an optical function of the optical module OM may be performed such as through the input/output of light at the front surface of the stretchable display device 1, to/from the optical module OM. A shape or outline of the optical module OM indicated in the drawings may represent an input/output portion of the optical module OM, without being limited thereto.

In response to the stretchable display panel 200 being contracted in a direction, the fixing member FM, which is fixed to the bottom surface of the stretchable display panel 200, may be deformed. Specifically, as mentioned above, the positions of the fixed shafts 10, which are fixed to the stretchable display panel 200, may change. The positions of the fixed shafts 10 may be changeable relative to the overall stretchable display device 1 and/or to each other. Once the stretchable display panel 200 is contracted in the one direction by an external force applied to the stretchable display panel 200, the stretchable display panel 200 may maintain a contracted position instead of returning to an original (e.g., expanded) shape, even after the disappearance of the external force due to the fixing member FM, which is only affected by a force stronger than the restoring force of the stretchable display panel 200.

Both of opposing sides of the stretchable display panel 200 may be fixed to the frame member 100 by the fixing parts FP. In FIG. 4, for example, left and right sides of the stretchable display panel 200 may be fixed to the frame member 100 by the fixing parts FP. As a result, the stretchable display panel 200 may be contracted in such a manner that only a middle portion of the side to which an external force is applied is inwardly recessed, while positions of the left and right edge portions of the stretchable display panel 200 are maintained. In FIG. 4, for example, a middle portion of a top side at which the optical module OM is disposed and to which an external force is applied is inwardly recessed.

In FIGS. 2 and 3, when the optical module OM is not in use, a total planar area of the front surface of the stretchable display device 1 includes only planar areas of the frame 100 and the stretchable display panel 200 in the top plan view, since a planar area of the optical module OM is disposed within the planar area of the stretchable display panel 200. That is, the optical module OM does not occupy a planar area separate from that of the stretchable display panel 200 when the optical module OM is not in use.

Since the optical module OM is made visible only when such optical module OM is to be used, by using the stretchability of the stretchable display panel 200, any additional space to make the optical module OM visible from the front of the stretchable display device 1 when the optical module OM is not in use, is obviated. Since the optical module OM does not occupy a planar area separate from that of the stretchable display panel 200 when the optical module OM is not in use, almost the entire front surface of the stretchable display device 1 can be used as a display surface (via the function of the stretchable display panel 200) when the optical module OM is not in use. In other words, in theory, the screen-to-body ratio of the stretchable display device 1 may be up to 100%, especially when a planar area of the frame 100 is minimized or omitted and a planar area of the stretchable display panel 200 is maximized even in the presence of the frame 100.

Figure 6:
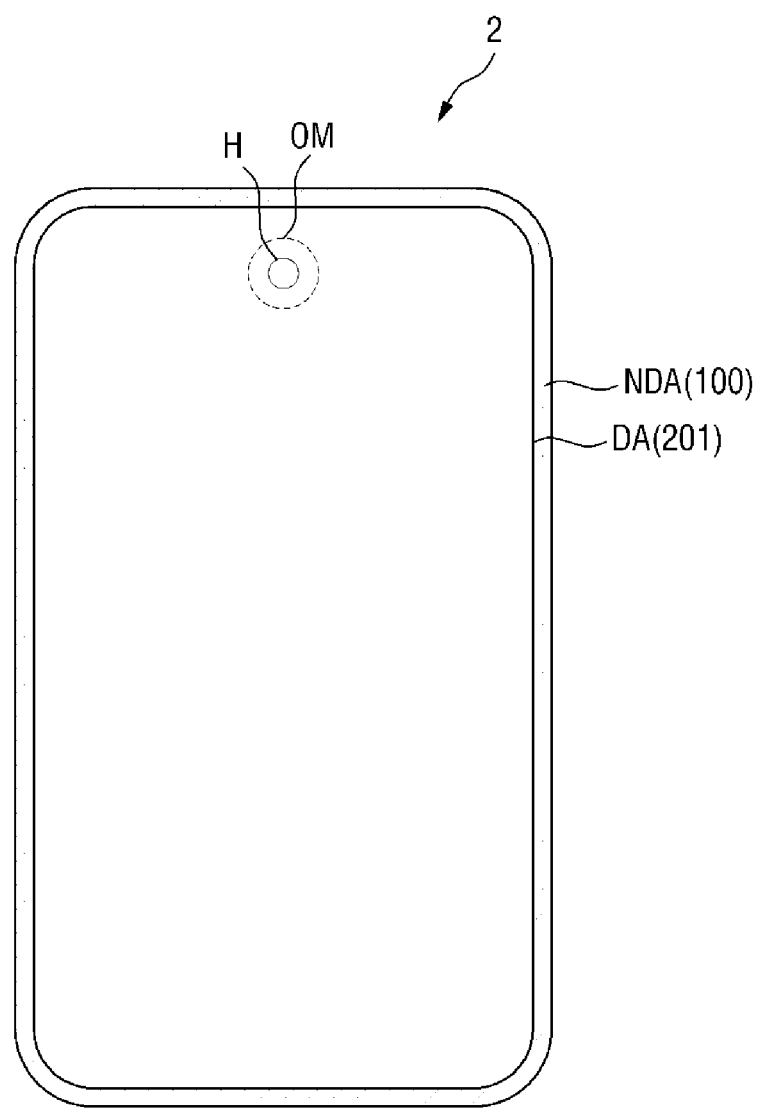
FIG. 6 is a top plan view of another exemplary embodiment of a stretchable display device according to the invention.
Figure 7:
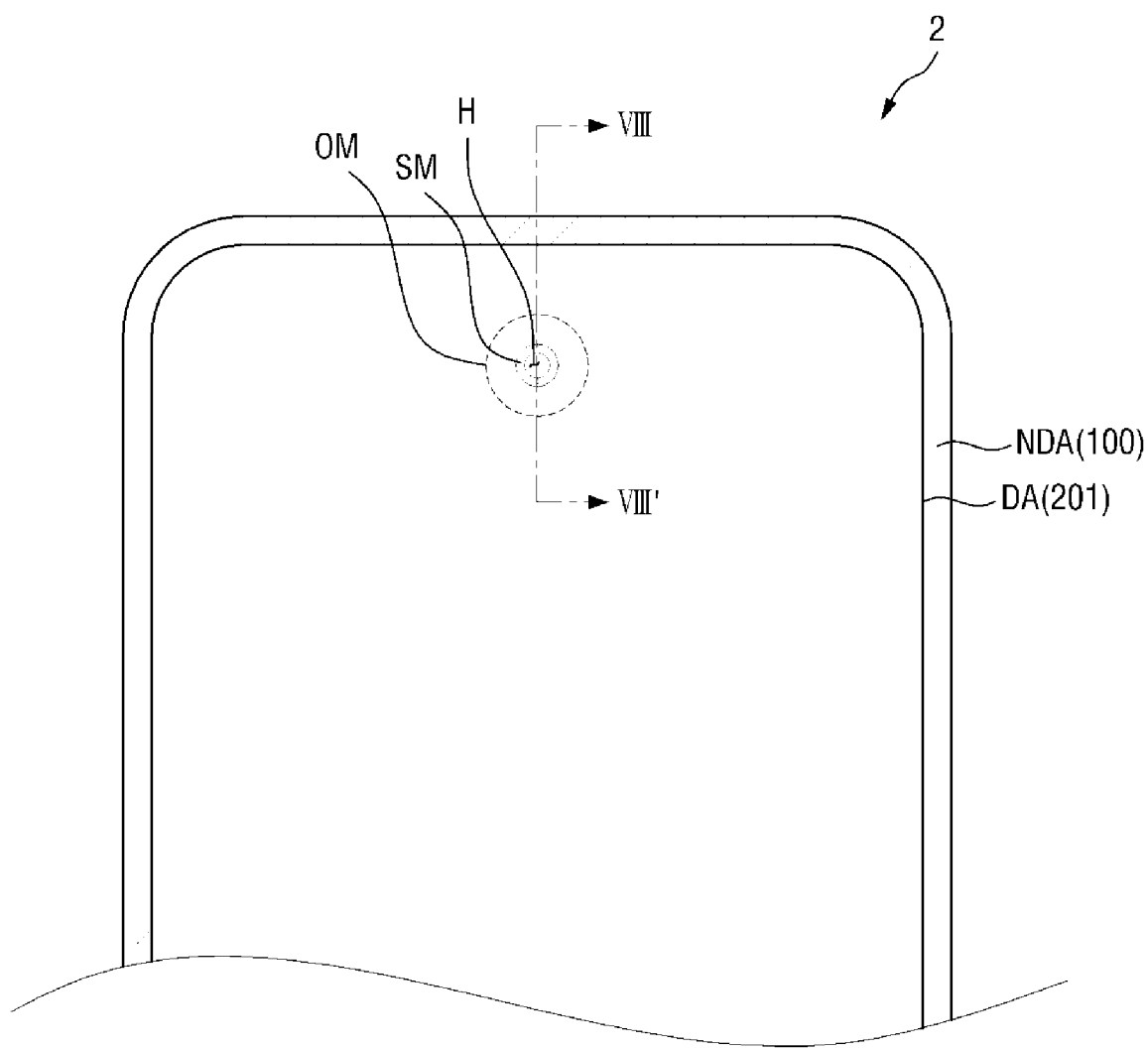
FIG. 7 is an enlarged top plan view of an area including an optical module of FIG. 6.
Figure 8:
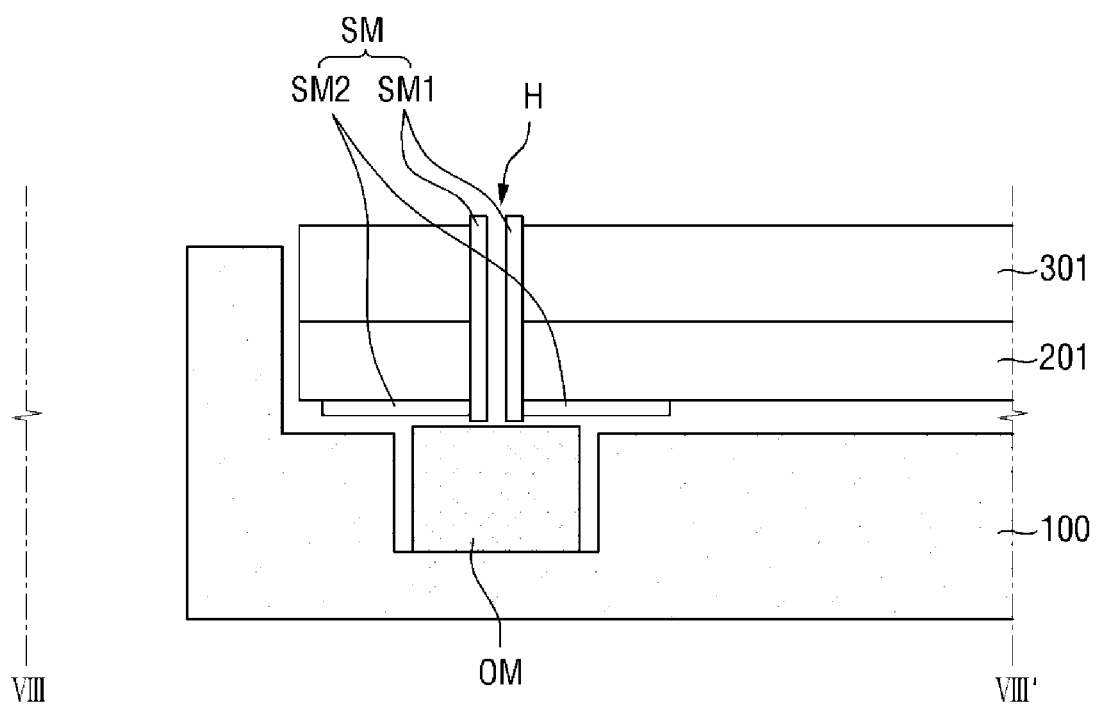
FIG. 8 is a cross-sectional view taken along line VIII-VIII' of FIG. 7.
Figure 9:
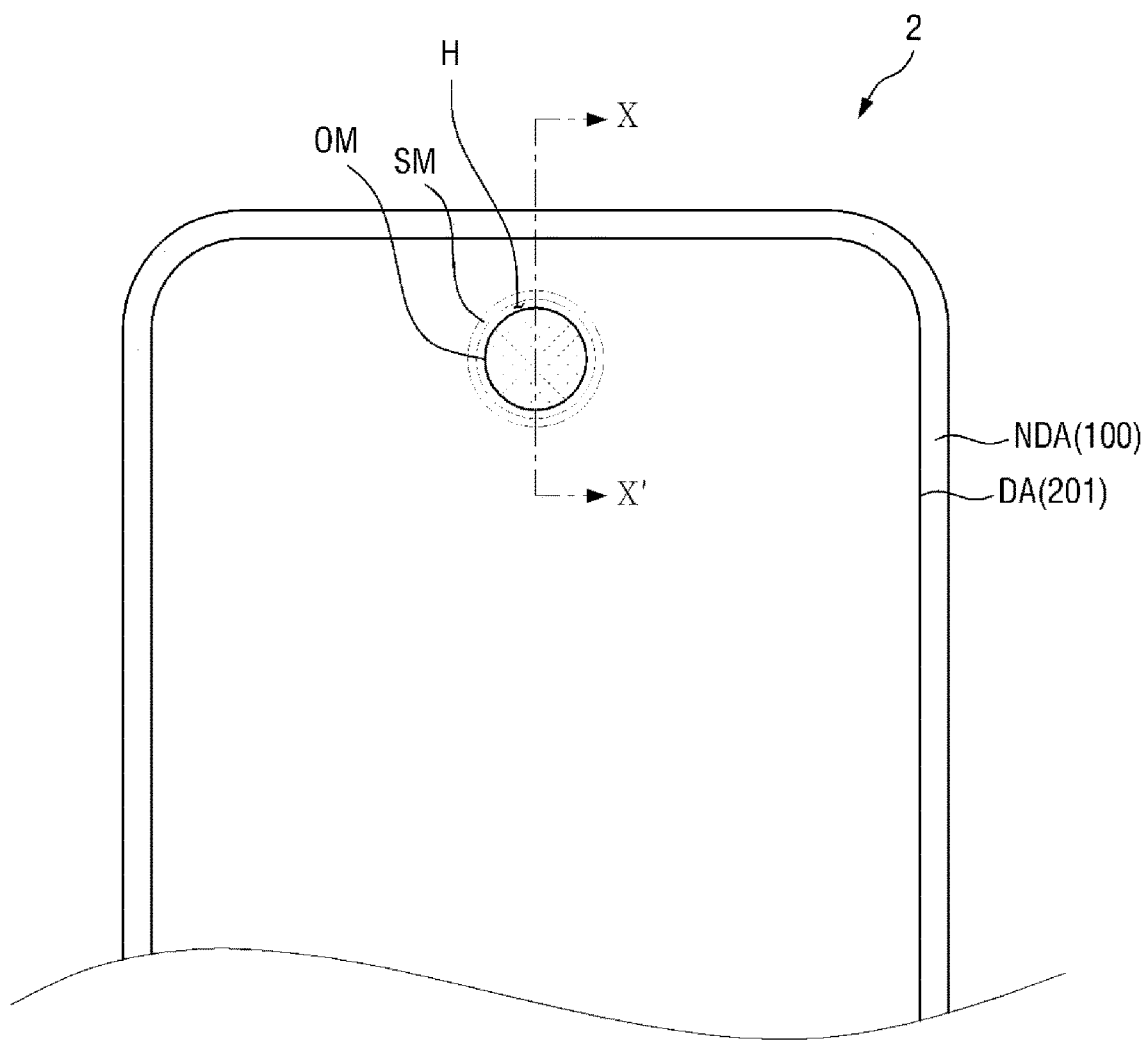
FIG. 9 is a top plan view illustrating the stretchable display panel of FIG. 7 in a state of being stretched at a cutting hole thereof.
Figure 10:
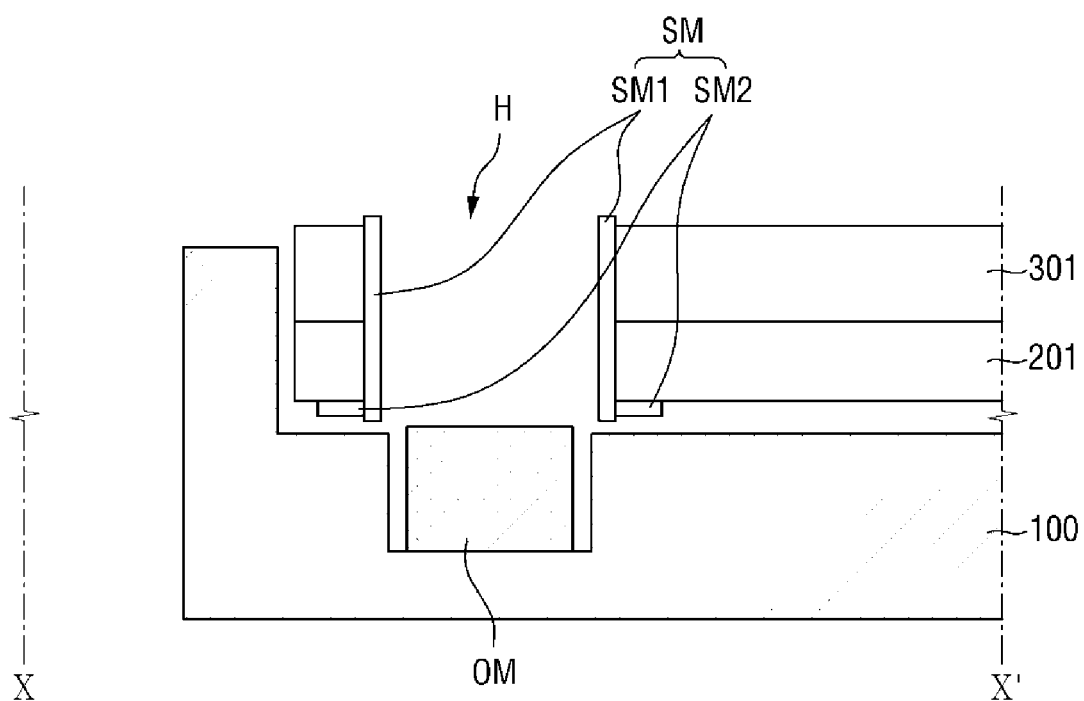
FIG. 10 is a cross-sectional view taken along line X-X' of FIG. 9.

FIG. 6 is a top plan view of another exemplary embodiment of a stretchable display device according to the invention, FIG. 7 is an enlarged top plan view of an area including an optical module of FIG. 6, FIG. 8 is a cross-sectional view taken along line VIII-VIII' of FIG. 7, FIG. 9 is a top plan view illustrating the stretchable display panel of FIG. 7 in a state of being stretched at a cutting hole thereof, and FIG. 10 is a cross-sectional view taken along line X-X' of FIG. 9.

A stretchable display device 2 of FIGS. 6 through 10 is the same as the stretchable display device 1 of FIGS. 1 through 5 except that a cutting hole H is defined in a stretchable display panel 201 and the stretchable display device 2 includes a shutter member SM, instead of a fixing member FM. Accordingly, the stretchable display device 2 will hereinafter be described, focusing mainly on differences with the stretchable display device 1.

Referring to FIGS. 6 through 8, the cutting hole H, which penetrates the stretchable display panel 201, may be defined in the stretchable display panel 201 by portions thereof, to be an enclosed opening within the stretchable display panel 201. The cutting hole H may penetrate the stretchable display panel 201 in a thickness direction of the stretchable display panel 201, e.g., a vertical direction (in FIG. 8). A cutting hole H may also be defined in a window 301, and the cutting hole H of the window 301 may be aligned with the cutting hole H of the stretchable display panel 201 to form a single continuous cutting hole H.

The cutting hole H may be disposed or formed in an area overlapping with an optical module OM in the top plan view, but the present disclosure is not limited thereto. That is, the cutting hole H may be disposed or formed in an area that substantially appears to overlap with the optical module OM. In an equilibrium state where no particular external force is applied to the stretchable display panel 201, the cutting hole H may be an opening narrow enough for the optical module OM to be not visible from outside the stretchable display device 2, such as from a front surface (e.g., viewing side) of the stretchable display device 2.

The cutting hole H may refer to the shape of a space or an incision that exists in the stretchable display panel 201 in the absence of an external force.

The shutter member SM, expands and/or contracts the cutting hole H or maintains the cutting hole H to be expanded or contracted. Specifically, the shutter member SM may include a stretching member SM1 which is disposed along the inner wall of the cutting hole H, and a stretching control member SM2 which is connected to the stretching member SM1 and is disposed on the bottom surface of the stretchable display panel 201. As being expanded, a distance between inner walls of the cutting hole H within the stretchable display panel 201 is increased. As being contracted, a distance between inner walls of the cutting hole H within the stretchable display panel 201 is reduced.

The stretching member SM1 may be an annular stretchable member disposed to cover the inner wall of the cutting hole H. The stretching control member SM2 may be disposed at the bottom of the stretchable display panel 201 to support the outer side of the stretching member SM1 and to expand or contract the stretching member SM1 or to maintain the stretching member SM1 to be expanded or contracted. The stretching control member SM2 may be configured to receive power from the outside in order to perform the stretching function of the shutter member SM. An internal force of the shutter member SM, owing to the operation of the stretching member SM1 and the stretching control member SM2, may maintain a size of the cutting hole H.

Referring to FIGS. 9 and 10, the cutting hole H of the stretchable display panel 201 may be expanded by an external force applied to the stretchable display panel 201 via the shutter member SM attached thereto. Then, the optical module OM, which is hidden from view by the stretchable display panel 201 in the equilibrium state, may be exposed from the stretchable display panel 201 and may perform an optical function through the input/output of light at the front surface of the stretchable display panel 201.

A size of the cutting hole H may be expanded by the shutter member SM disposed in the cutting hole H, particularly, by deformation of the stretching member SM1 of the shutter member SM. The size of the cutting hole H is changed within the plane of the stretchable display panel 201, that is, in the first and/or second directions which define the plane of the stretchable display panel 201. Portions of the stretchable display panel 201 are displaced within the plane thereof to contract or expand the cutting hole H and change the size thereof. As the stretching member SM1, which has an annular shape, is expanded, a size of the cutting hole H supported by the stretching member SM1 on the inner sidewall thereof may also be expanded. That is, the stretching member SM1 can serve as a diaphragm for controlling an exposure amount of the optical module OM to outside the stretchable display device 2.

The expansion of the stretching member SM1 may also be performed by the stretching control member SM2, which is connected to the outer side of the stretching member SM1. Also, the stretching control member SM2 maintains a force applied to the stretching member SM2 to maintain the stretching member SM1 in an expanded state, and as a result, the cutting hole H may be maintained to be expanded as having an increased size thereof.

While the expansion/contraction of the cutting hole H may be performed by the shutter member SM as described above, the invention is not limited thereto. In an alternative exemplary embodiment, the cutting hole H may be expanded to increase a size thereof or contracted to reduce the size thereof, by an external force applied by a user.

Since the cutting hole H of the stretchable display panel 201 is disposed or formed to be sufficiently small in size in the equilibrium state such that the optical module OM is not visible at the front surface of the stretchable display device 2, the cutting hole H may not affect an image output on the display surface of the stretchable display panel 201. Accordingly, in the exemplary embodiment of FIGS. 6 through 10, like in the exemplary embodiment of FIGS. 1 through 5, almost the entire front surface of the stretchable display device 2 can be used as a display surface (via the function of the stretchable display panel 201) when the optical module when the optical module OM is not in use.

Figure 11:
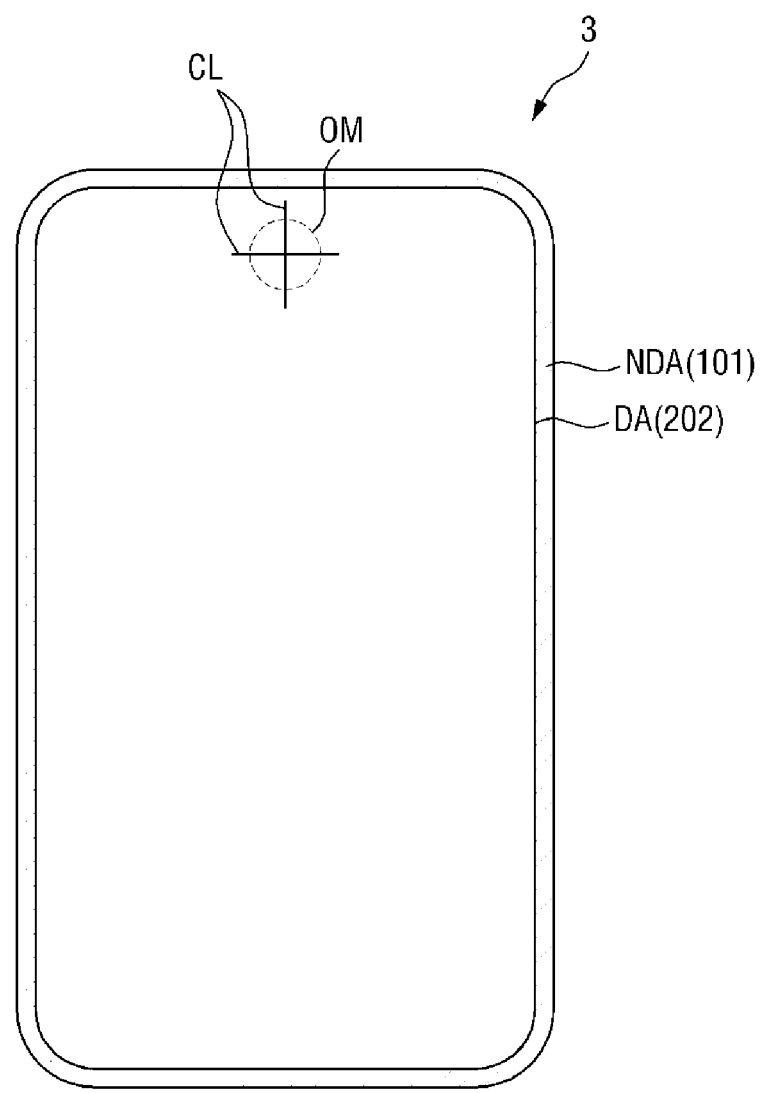
FIG. 11 is a top plan view of still another exemplary embodiment of a stretchable display device according to the invention.
Figure 12:
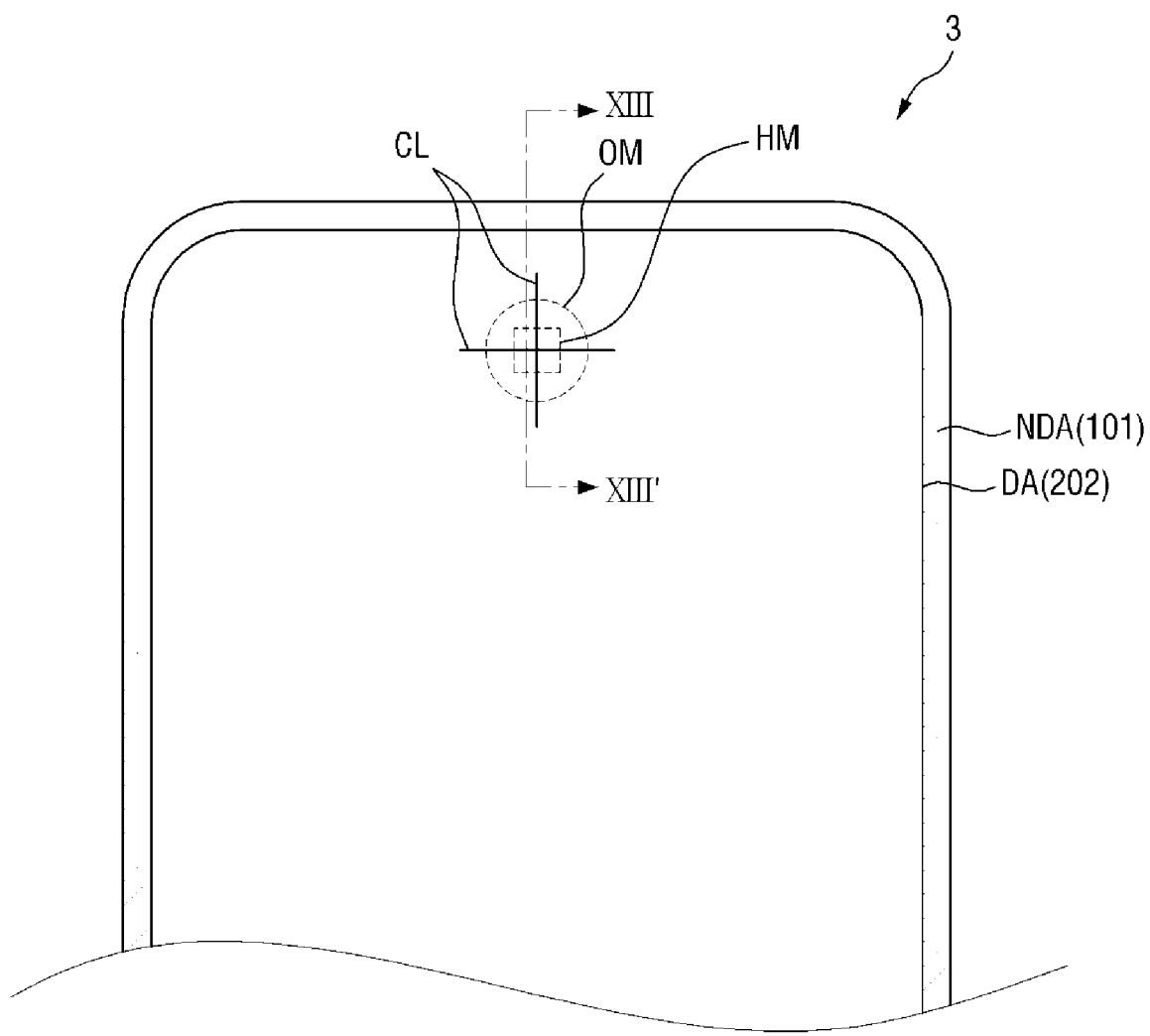
FIG. 12 is an enlarged top view of an area including an optical module of FIG. 11.
Figure 13:
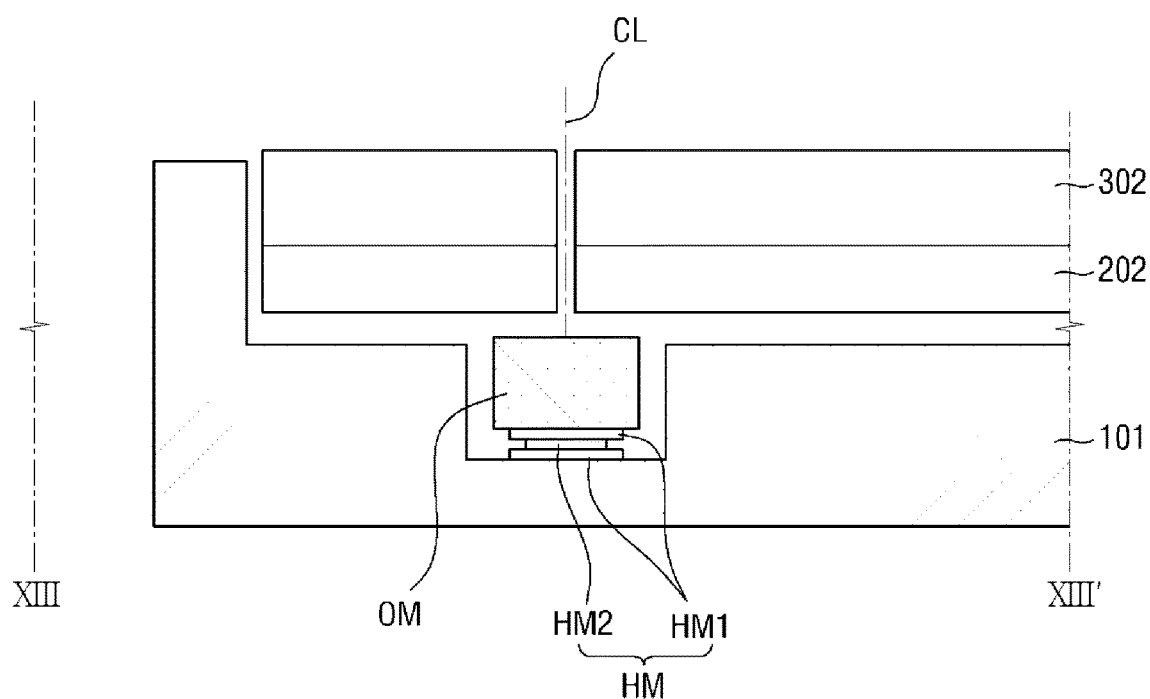
FIG. 13 is a cross-sectional view taken along line XIII-XIII' of FIG. 12.
Figure 14:
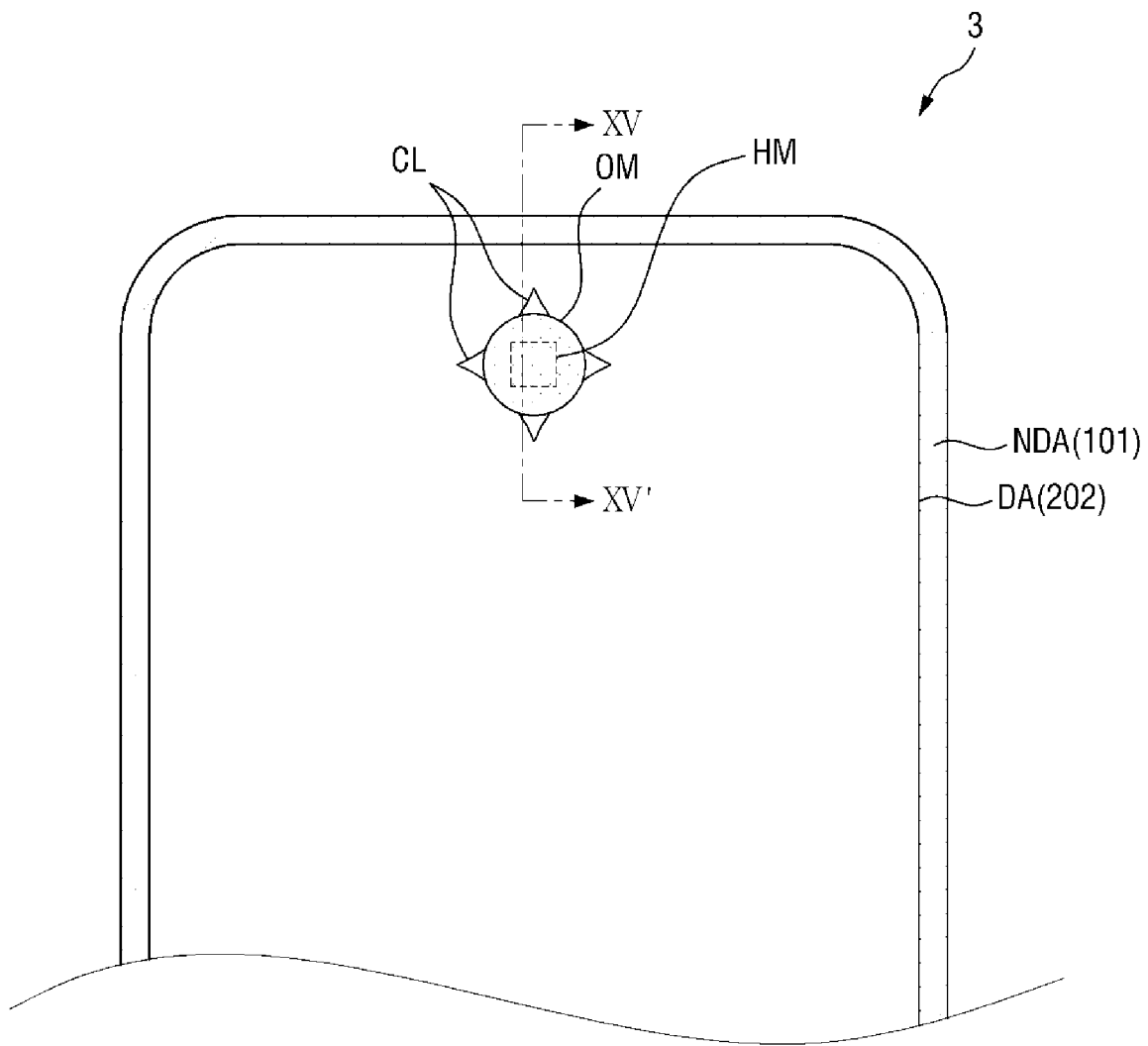
FIG. 14 is a top plan view illustrating the a stretchable display panel of FIG. 12 in a state of being stretched at a cut portion thereof.
Figure 15:
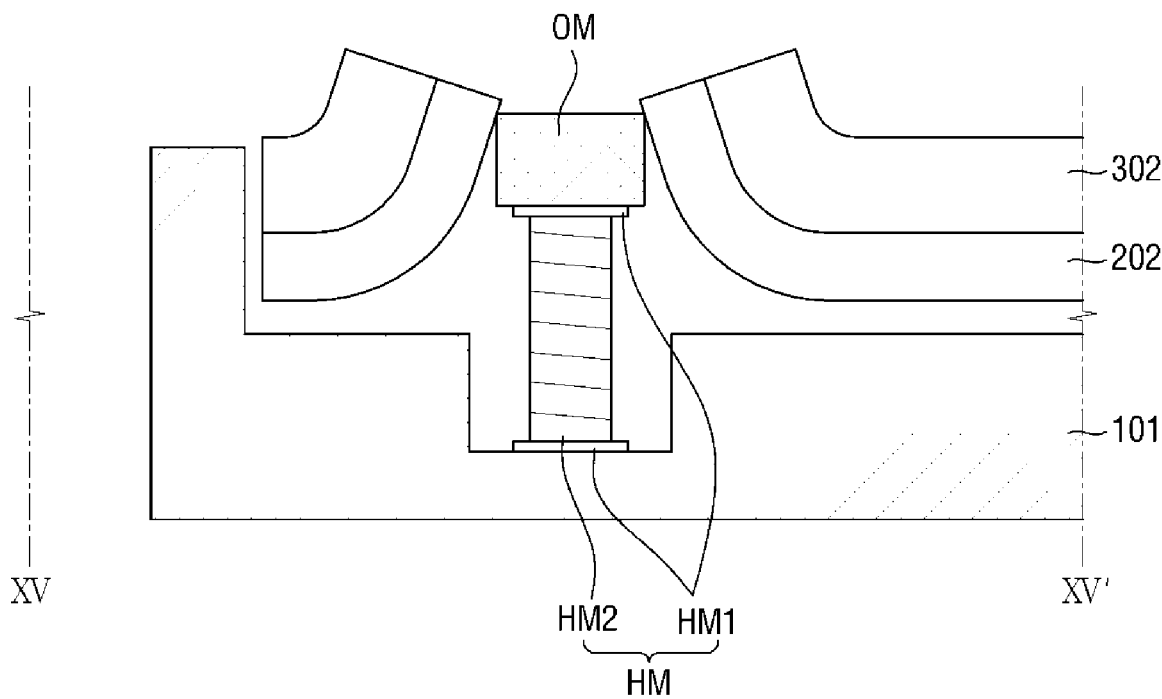
FIG. 15 is a cross-sectional view taken along line XV-XV' of FIG. 14.

FIG. 11 is a top plan view of still another exemplary embodiment of a stretchable display device according to the invention, FIG. 12 is an enlarged view of an area including an optical module of FIG. 11, FIG. 13 is a cross-sectional view taken along line XIII-XIII' of FIG. 12, FIG. 14 is a top plan view illustrating a stretchable display panel of FIG. 12 in a state of being stretched at a cut portion thereof, and FIG. 15 is a cross-sectional view taken along line XV-XV' of FIG. 14.

A stretchable display device 3 of FIGS. 11 through 15 is the same as the stretchable display device 1 of FIGS. 1 through 5 except that a cutting line CL is defined in a stretchable display panel 202 and the stretchable display device 3 includes a height control member HM, instead of a fixing member FM. Accordingly, the stretchable display device 3 will hereinafter be described, focusing mainly on differences with the stretchable display device 1.

Referring to FIGS. 11 through 13, one or more cutting lines CL, such as formed by cutting a stretchable display panel 202, may be defined on the stretchable display panel 202. Each of a plurality of cutting lines CL may extend along a thickness direction of the stretchable display panel 202, e.g., a vertical direction in FIG. 13. One or more cutting line CL may also be disposed or formed in a window 302, and the cutting lines CL of the stretchable display panel 202 may be incorporated (e.g., aligned or correspond) with the cutting lines CL of the stretchable display panel 202.

The cutting lines CL may be disposed or formed to at least partially overlap with an optical module OM on a plane, but the present disclosure is not limited thereto. That is, cutting lines CL substantially at least partially overlapping with the optical module OM may also fall within the scope of the invention.

The cutting lines CL may refer to linear cuts or openings defined or formed in the stretchable display panel 202. Accordingly, in an equilibrium state where no particular external force is applied to the stretchable display panel 202, the optical module OM may not be visible from the outside.

A plurality of cutting lines CL may be defined to intersect one another. In some exemplary embodiments, two cutting lines CL may be disposed or formed to intersect each other and thus to form a cross (+) shape, but the number and shape of the cutting lines CL may vary. That is, alternatively, three or more cutting lines CL may be disposed or formed to intersect one another and thus to form an asterisk (*). Still alternatively, a plurality of cutting lines CL may be formed, and only some of the plurality of cutting lines may intersect one another.

A height control member HM, which is capable of controlling the height of the optical module OM, may be disposed below the optical module OM. Specifically, the height control member HM may include a pair of supporting members HM1, which are fixed to a frame member 101, and a variable member HM2, which connects the support members HM1 to each other and has a variable length. The height of components described above is taken from a reference, such as from a surface of the frame 101.

Since the variable member HM2 has a variable length, a distance between the supporting members HM1 may also be variable, and as a result, the height of the optical module OM can be controlled. In an exemplary embodiment, the variable member HM2 has a variable length by screw threads formed on the outer circumferential surface of the variable member HM2, but the present disclosure is not limited thereto.

Referring to FIGS. 14 and 15, the optical module OM may be moved upwardly (e.g., away from the frame 101 or toward the stretchable display panel 202) by the height control member HM and may thus be inserted into the cut portion of the stretchable display panel 202. The stretchable display panel 202 may be deformed at the cutting lines CL owing to the stretchability thereof, such that the optical module OM can be inserted into the cut portion of the stretchable display panel 202. The optical module OM contacts the stretchable display panel 202 to displace the stretchable display panel 202 out of the plane thereof, that is, along a thickness direction. As a result, the optical module OM, which is hidden from view by the stretchable display panel 202 in the equilibrium state, may be exposed and may perform an optical function through the input/output of light at the front surface of the stretchable display device 3. Accordingly, in the exemplary embodiment of FIGS. 11 through 14, like in the exemplary embodiments of FIGS. 1 through 5 and FIGS. 6 through 10, almost the entire front surface of a stretchable display device 3 can be used as a display surface (via the function of the stretchable display panel 200) when the optical module OM is not in use.

Figure 16:
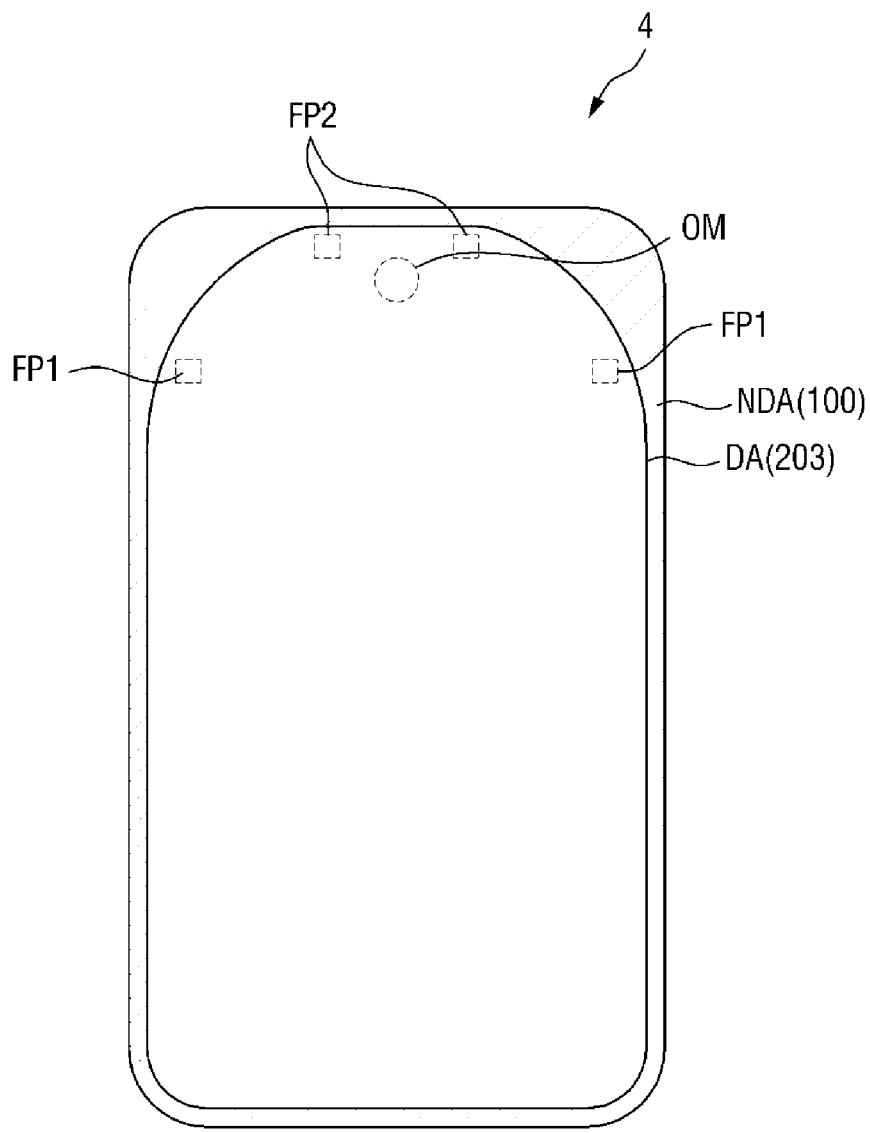
FIG. 16 is a top plan view of yet another exemplary embodiment of a stretchable display device according to the invention.
Figure 17:
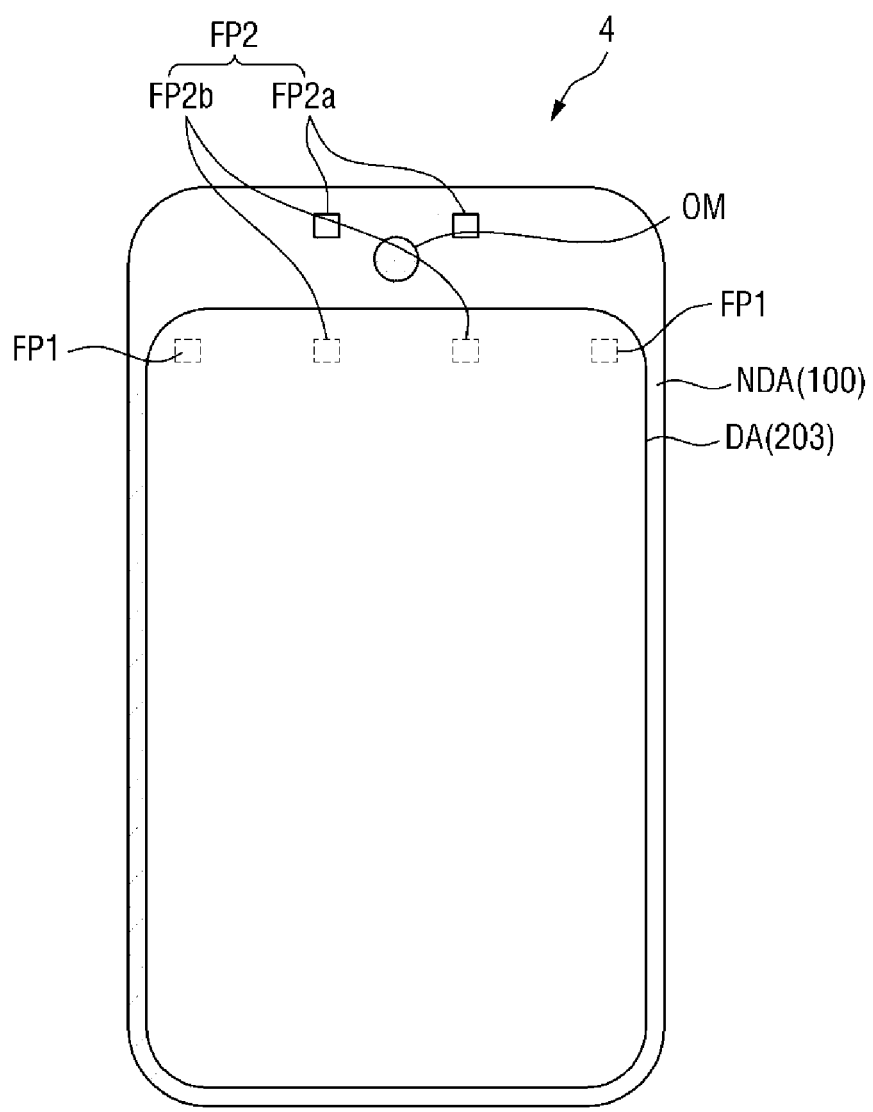
FIG. 17 is a top plan view illustrating the stretchable display panel of FIG. 16 in a state of being stretched in one direction.

FIG. 16 is a top plan view of yet another exemplary embodiment of a stretchable display device according to the invention, and FIG. 17 is a top plan view illustrating a stretchable display panel of FIG. 16 in a state of being stretched in one direction.

A stretchable display device 4 of FIGS. 16 and 17 is the same as the stretchable display device 1 of FIGS. 1 through 5 except that an optical module OM is exposed from a stretchable display panel 203 to be usable at a front surface of the stretchable display device 4 when the stretchable display panel 203 is in an equilibrium state. Accordingly, the stretchable display device 4 will hereinafter be described, focusing mainly on differences with the stretchable display device 1.

Referring to FIG. 16, in a stretched state, a position of an upper portion of the stretchable display panel 203 may be maintained stretched within the plane of the stretchable display panel 203, in an upward direction. The shape of the stretchable display panel 203 in the stretched state thereof can be maintained by a first fixing part FP1 provided in plurality which respectively fix left and right sides of the stretchable display panel 203 to a frame member 100, and by a second fixing part FP2 provided in plurality which fix the upper side of the stretchable display panel 203 to the frame member 100. The optical module OM, which is disposed on a rear surface of the stretchable display panel 203, may be covered by the stretched upper portion of the stretchable display panel 203 and thus may not be exposed in the stretched state of the stretchable display panel 203.

Referring to FIG. 17, in the equilibrium state, as the upper portion of the stretchable display panel 203 is detached from the frame member 100 and is contracted due to a restoring force of the stretchable display panel 203, the optical module OM once hidden from view by the upper portion of the stretchable display panel 203 may now be exposed at the front surface of the stretchable display device 4.

The second fixing parts FP2 may make the stretchable display panel 203 attachable to and detachable from the frame member 100. Each of the second fixing parts FP2 may include a frame fixing part FP2*a* and a panel fixing part FP2*b*. The frame fixing parts FP2*a* are attached and fixed to the frame member 100, and the panel fixing parts FP2*b* are attached and fixed to the rear surface of the stretchable display panel 203. A position of the frame fixing parts FP2*a* is fixed relative to the frame member 100, and a position of the panel fixing parts FP2*b* are movable relative to the frame member 100. The frame fixing parts FP2*a* and the panel fixing parts FP2*b* may be coupled to or detached from each other and may thus make the stretchable display panel 203 attachable to and detachable from the frame member 100.

As described above, the optical module OM may be exposed when the stretchable display panel 203 is contracted to be in an equilibrium state. The optical module OM may be exposed when the stretchable display panel 203 returns to an original shape thereof due to a restoring force thereof.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A display device comprising:
   a display panel which is deformable and includes:
      a display surface at which an image is displayed,
      the display surface defining a plane, and
      the display surface occupying a planar area within the plane; and
   an optical module which is coverable by the display surface,
   wherein
   deformation of the display panel:
      reduces the planar area which is occupied by the display surface to dispose the optical module which is covered by the display surface of the display panel, exposed to outside the display panel at the display surface thereof, or
      increases the planar area which is occupied by the display surface to dispose the optical module which is exposed to outside the display panel at the display surface thereof, covered by the display surface of the display panel.

2. The display device of claim 1, wherein the deformation of the display panel includes contraction of the display panel within the place defined by the display surface, and the contraction of the display panel reduces the planar area which is occupied by the display surface to dispose the optical module which is covered by the display surface of the display panel, exposed to outside the display panel at the display surface thereof.

3. The display device of claim 2, further comprising:
   a fixing member between the display panel and the optical module, wherein the fixing member maintains the display panel contracted.

4. The display device of claim 1, wherein
   a hole is defined penetrating the display panel in a thickness direction thereof, the hole corresponding to the optical module,
   the deformation of the display panel includes contraction of the display panel within the plane defined by the display surface, and
   the contraction of the display panel expands the hole which reduces the planar area which is occupied by the display surface to dispose the optical module which is covered by the display surface of the display panel, exposed to outside the display panel at the display surface thereof.

5. The display device of claim 4, further comprising:
   a shutter member in the hole, wherein the shutter member maintains the hole expanded.

6. The display device of claim 1, wherein
   a linear opening into which the optical module is insertable, is defined penetrating the display panel in a thickness direction thereof, the linear opening corresponding to the optical module, and
   insertion of the optical module into the linear opening deforms the display panel to expand a size of the linear opening in the display panel,
   wherein expansion of the linear opening reduces the planar area which is occupied by the display surface to dispose the optical module which is covered by the display surface of the display panel, exposed to outside the display panel at the display surface thereof.

7. The display device of claim 6, further comprising:
   a height control member on a side of the optical module opposite to the display panel, wherein the height control member moves the optical module into and out of the linear opening of the display panel.

8. The display device of claim 6, wherein the linear opening into which the optical module is insertable is provided in plural intersecting one another.

9. The display device of claim 1, wherein the optical module comprises a camera module.

10. A display device comprising:
    a display panel which is deformable and includes:
       a display surface at which an image is displayed,
       the display surface defining a plane, and
       the display surface occupying a planar area within the plane; and
    an optical module which performs a function using light and is coverable by the display surface,
    wherein deformation of the display panel changes the planar area which is occupied by the display surface to dispose the optical module which is covered by the display surface of the display panel, exposed to outside the display panel at the display surface thereof.

11. The display device of claim 10, wherein
    an area of the display panel corresponds to the optical module,
    the deformation of the display panel includes contraction of the display panel within the plane defined by the display surface, and contraction of the display panel at the area thereof reduces the planar area which is occupied by the display surface to dispose the optical module which is covered by the display surface of the display panel, exposed to outside the display panel at the display surface thereof.

12. The display device of claim 11, further comprising:
a fixing member which is between the display panel and the optical module and maintains the display panel contracted,
wherein the fixing member includes fixed shafts fixed to the display panel, movable shafts not fixed to the display panel, and link members connecting the fixed shafts and the movable shafts to each other.

13. The display device of claim 10, wherein
a hole is defined penetrating the display panel in a thickness direction thereof, the hole corresponding to the optical module,
the deformation of the display panel includes contraction of the display panel within the plane defined by the display surface, and
contraction of the display panel at the hole expands the hole which reduces the planar area which is occupied by the display surface to dispose the optical module which is covered by the display surface of the display panel, exposed to outside the display panel at the display surface thereof.

14. The display device of claim 13, further comprising:
a shutter member which is in the hole and maintains the cutting hole expanded.

15. The display device of claim 10, wherein
a linear opening into which the optical module is insertable, is defined penetrating the display panel in a thickness direction thereof, the linear opening corresponding to the optical module, and
insertion of the optical module into the linear opening along the thickness direction deforms the display panel to expand a size of the linear opening in the display panel,
wherein expansion of the linear opening reduces the planar area which is occupied by the display surface to dispose the optical module which is covered by the display surface of the display panel, exposed to outside the display panel at the display surface thereof.

16. The display device of claim 15, further comprising:
a height control member on a side of the optical module opposite to the display panel, wherein the height control member moves the optical module into and out of the linear opening of the display panel.

17. A method of using an optical module of a display device, the method comprising:
providing a display panel which is deformable and includes:
a display surface at which an image is displayed,
the display surface defining a plane, and
the display surface occupying a planar area within the plane;
providing an optical module which performs a function with light and is coverable by the display surface of the display panel;
deforming the display panel to change the planar area which is occupied by the display surface, wherein the changing of the planar area exposes the optical module which is covered by the display surface of the display panel, to outside the display panel at the display surface thereof; and
using the exposed optical module to perform the function using the light.

18. The method of claim 17, wherein
the providing the display panel comprises defining a hole penetrating the display panel in a thickness direction thereof, the hole corresponding to the optical module, and
the deforming the display panel comprises contracting the display panel within the plane defined by the display surface, and
contraction of the display panel at the hole expands the hole which reduces the planar area which is occupied by the display surface to expose the optical module which is covered by the display surface of the display panel, to outside the display panel at the display surface thereof, at the expanded hole.

19. The method of claim 17, wherein
the providing the display panel comprises defining a linear opening into which the optical module is insertable, the linear opening penetrating the display panel in a thickness direction thereof and corresponding to the optical module, and
the deforming the display panel comprises inserting the optical module into the linear opening along the thickness direction, and
insertion of the optical module expands a size of the linear opening in the display panel which reduces the planar area which is occupied by the display surface to expose the optical module which is covered by the display surface of the display panel, to outside the display panel at the display surface thereof, at the expanded linear opening.

20. The method of claim 17, wherein the optical module comprises a camera module.

* * * * *